Jan. 30, 1968  J. R. STEVENS ET AL  3,366,685
PURIFICATION OF TERTIARY AMINES
Filed Oct. 30, 1963  2 Sheets-Sheet 1

3,366,685
PURIFICATION OF TERTIARY AMINES
John Rupert Stevens, Henley-on-Thames, Oxon, and Malcolm Patrick Simpson, Didcot, England, assignors to United Kingdom Atomic Energy Authority
Filed Oct. 30, 1963, Ser. No. 320,101
Claims priority, application Great Britain, Nov. 13, 1962, 42,990/62
7 Claims. (Cl. 260—583)

ABSTRACT OF THE DISCLOSURE

A method of reducing the secondary amine content of a mixture containing secondary and tertiary amines in which each aliphatic group attached to the nitrogen atom is a primary alkyl group containing from 6–10 carbon atoms and having a chain of at least 6 carbon atoms terminating at the nitrogen atom. The method comprises the addition of water and hydrogen fluoride to the amine mixture or partially neutralizing the hydrofluoride salts of the amine mixture, in the correct quantities to obtain two organic phases and possibly one aqueous phase, wherein the concentration of secondary amine relative to the concentration of hydrogen fluoride is different in the two organic phases and thereafter effecting separation of the two organic phases.

---

The present invention relates to the purification of tertiary amines.

We have described a process for the recovery of anhydrous hydrogen fluoride from a solution of the gas in water by extraction using long chain aliphatic tertiary amines in our Belgian Patent 609,937.

It has been found that in such use, degradation of the tertiary amine occurs, and although all the products of such degradation have not been identified with certainty, one of the major degradation products is known to be the corresponding secondary amine. It will be appreciated that the presence of such secondary amines in the said process is undesirable, since it effects dilution of the tertiary amine. Furthermore, the "commercial" samples of tertiary amines used in the said process also frequently contain quantities of secondary amine and non-basic substances such as aldehydes as impurities. It has also been found that the preferred tertiary amine, tri-nonylamine, tri-(3,5,5 trimethylhexyl) amine (hereinafter called T.N.A.) may contain, as impurity, an unstable substance which on heating or in the presence of certain acids or bases may break down into the secondary amine, dinonylamine, di-(3,5,5 trimethylhexyl) amine (hereinafter called D.N.A.) and the corresponding aldehyde, nonaldehyde (3,5,5 trimethyl hexaldehyde). The removal of the aforementioned impurities from the tertiary amine is therefore desirable.

The separation of primary, secondary and tertiary amines has been known for a considerable time. However, with long chain amines such as T.N.A., the salts formed in conventional extraction processes are water-insoluble, and do not pass into the aqueous phase to permit separation.

It is an object of the present invention to provide a method for the separation of secondary amines from tertiary amines which is particularly applicable to long chain aliphatic amines.

According to the present invention there is provided a method whereby a long chain tertiary amine may be effectively separated from a long chain secondary amine by the formation of two organic phases each including aqueous hydrogen fluoride and which differ in the relative concentrations of the secondary amine.

Such phase separation may be brought about in one of two ways. The first of these ways involves the treatment of the mixture of the tertiary and secondary amines with hydrogen fluoride and water in controlled amounts such that two organic phases are produced. Alternatively, a mixture of the amine hydrofluorides is partially neutralised, this again resulting in the formation of two organic phases. These two phases will be found to differ in their water and hydrogen fluoride contents. The phase with the higher hydrogen fluoride content is the heavy phase and it is in this heavy phase that the secondary amine is found to concentrate. The tertiary amine forms the base of each phase and thus has more or less the same concentration in each of the two phases.

The method of the present invention is applicable to aliphatic amines of the type (hereinafter called "the type defined") where each aliphatic group attached to the nitrogen atom is a primary alkyl group containing from 6 to 10 carbon atoms and having a chain of at least 6 carbon atoms terminating at the nitrogen atom.

The partition coefficient (K) for the secondary amine is about 5, the value varying between 3 and 10 according to conditions where K is defined as:

$$K = \frac{\text{Concentration of secondary amine in ``heavy'' phase}}{\text{Concentration of secondary amine in ``light'' phase}}$$

It is found that under the conditions of the present invention, the unstable impurity sometimes found in T.N.A. is broken down by the above treatment to form D.N.A. which concentrates in the heavy phase. Most aldehydes and non-basic substances are found to concentrate in the light phase, from which some of them may subsequently be removed by steam distillation.

The specific gravity difference between the two organic phases is low and separation of the two phases is therefore slow, but this separation may be speeded up by centrifuging or cycloning the liquids.

In order that the present invention may more readily be understood, the phase equilibria set up in the system tri-nonylamine-water-hydrogen fluoride will now be described with reference to accompanying drawings, wherein.

Figure 1:
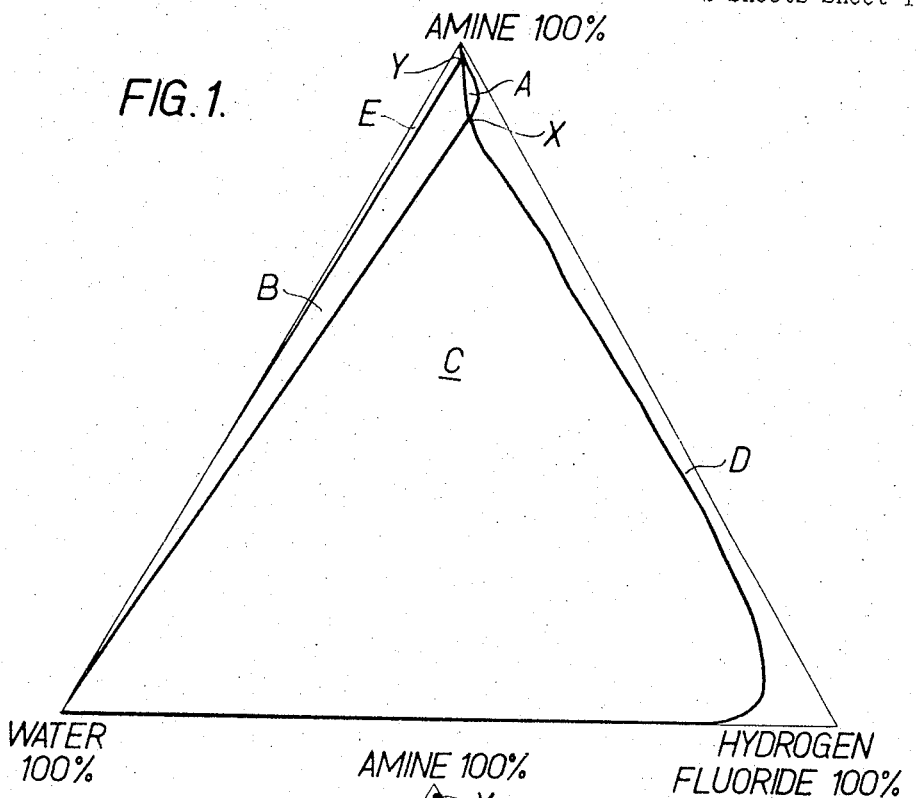
FIG. 1 is a ternary diagram for the system nonylamine-water-hydrogen fluoride.
Figure 2:
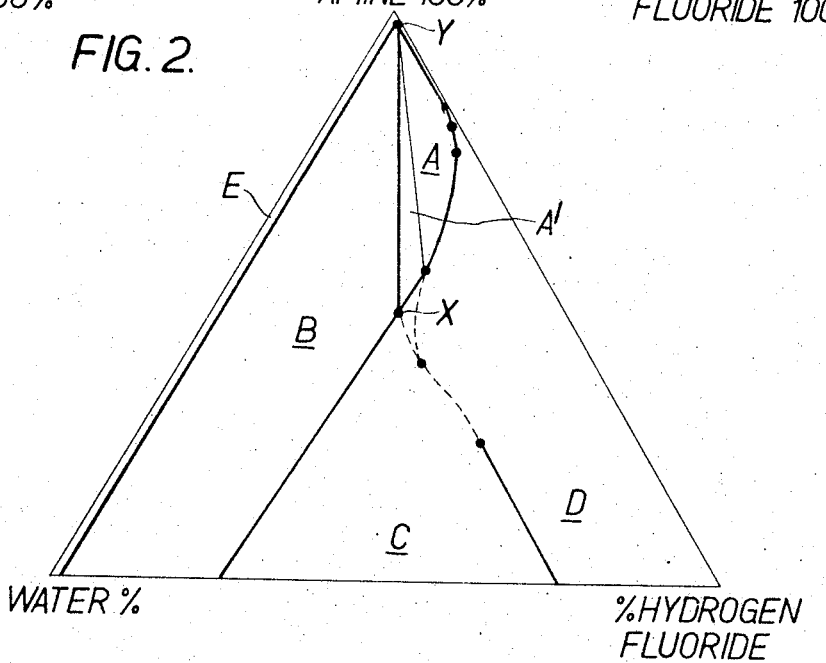
FIG. 2 is an enlarged portion of FIG. 1.

The ternary diagram of FIGS. 1 and 2 was obtained using an amine of nominal composition: T.N.A. 95%, D.N.A. 3.5% and "non-basics" 1.5%, the compositions being expressed in weight percentages. It will be appreciated that although the exact shape of the ternary diagram will be dependent on the composition of the amine being studied, the general shape will be similar to that shown in FIGS. 1 and 2.

Referring to FIG. 1, it can be seen that in this system five different phase equilibria are set up, these being indicated by the regions A, B, C, D and E of the phase diagram. The number of phases occurring in the various regions, and their nature, are as given in Table I.

TABLE I

| Region | No. of phases | Nature of phases |
|---|---|---|
| A | 2 | Organic based phases, the heavier phase having a higher hydrogen fluoride content than the lighter phase. |
| B | 3 | Two organic phases, the third phase being a dilute aqueous solution of hydrogen fluoride. In this region the composition of each phase is invariant, the organic phase compositions being X and Y respectively. |
| C | 2 | One organic phase and one aqueous phase. |
| D | 1 | An organic phase of low water content. |
| E | 2 | One organic phase and one aqueous phase. |

From Table I and FIG. 1, it can be seen that only in a small region (A) of the ternary diagram does phase splitting occur to give the two organic phases which are required in order to perform the present invention. However, in the region B, where three phases occur, two of these phases are the desired organic phases and thus this region of the ternary diagram may also be used for carrying out the present invention. Thus, the section of the ternary diagram which is of primary interest in order to carry the present invention into effect is the section of high amine content, and relatively low water and hydrogen fluoride contents. This section of the ternary diagram is shown in more detail in FIG. 2, from which it can be seen that no phase split occurs in the complete absence of water. From FIG. 2, the minimum and maximum limits of water and hydrogen fluoride contents for the formation of two organic phases, corresponding to point Y and X respectively on the phase diagram, may be deduced, and these are shown in Table II.

TABLE II.—APPROXIMATE LIMITS FOR TWO PHASE SEPARATION

| Component | Percent by wt. at point Y | Percent by wt. at point X |
|---|---|---|
| Amine | 99.4 | 89.5 |
| Water | 0.2 | 5.0 |
| Hydrogen fluoride | 0.4 | 5.5 |

A region A' forms an indefinite boundary between the regions A and B, the number of phases produced by compositions falling within the region A' not having been determined with certainty.

Although the phase equilibria have been studied in detail for the system nonylamine-water-hydrogen fluoride, we have confirmed that splitting to give two organic phases also occurs with the tertiary amines, tri(n-octyl) amine, tri(iso-octyl) amine and tri(iso-decyl) amine. We have also found that no phase splitting occurs with the tertiary amine, tri(amyl) amine, only one organic phase occurring when this amine is mixed with water and hydrogen fluoride.

Figure 3:
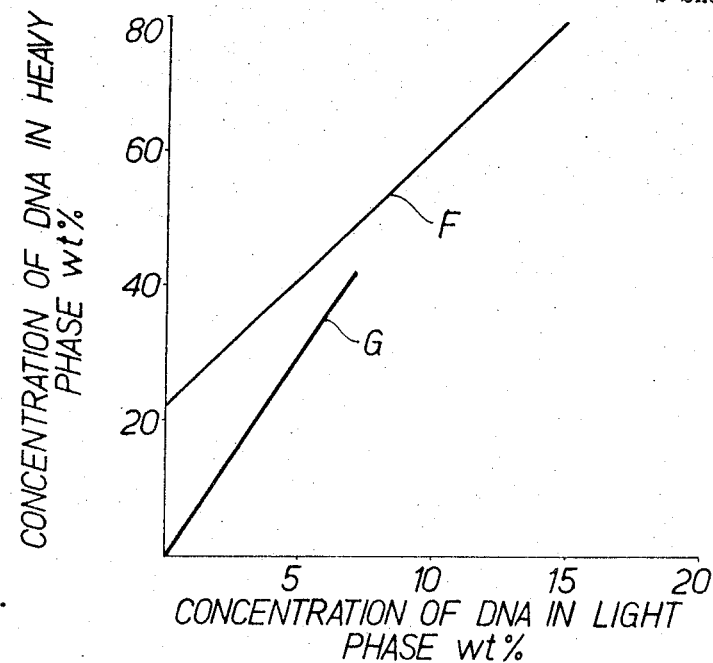
FIG. 3 shows the relationship between D.N.A. concentration in the heavy and light phases.

In order to ascertain the most favourable conditions for separating the secondary amine (D.N.A.) from the tertiary amine (T.N.A.) the distribution of the secondary amine between the two organic phases was determined and the results of these determinations, using amines of different secondary content are shown in FIG. 3. The curve F was obtained using a degraded amine, which had an initial composition of approximately 90% by weight T.N.A., 6% by weight secondary amine, mainly D.N.A., and 4% by weight of non-basic material and which had been thermally degraded until the D.N.A. content was about 20% by weight. The curve G was obtained using a material of lower secondary content, having a composition of 88% by weight tertiary amine, 8% by weight secondary amine and the balance non-basic material. It will be seen that the secondary amine content affects its distributions between the two organic phases but that even at comparatively low secondary amine content, it concentrates in the heavy phase.

Figure 4:
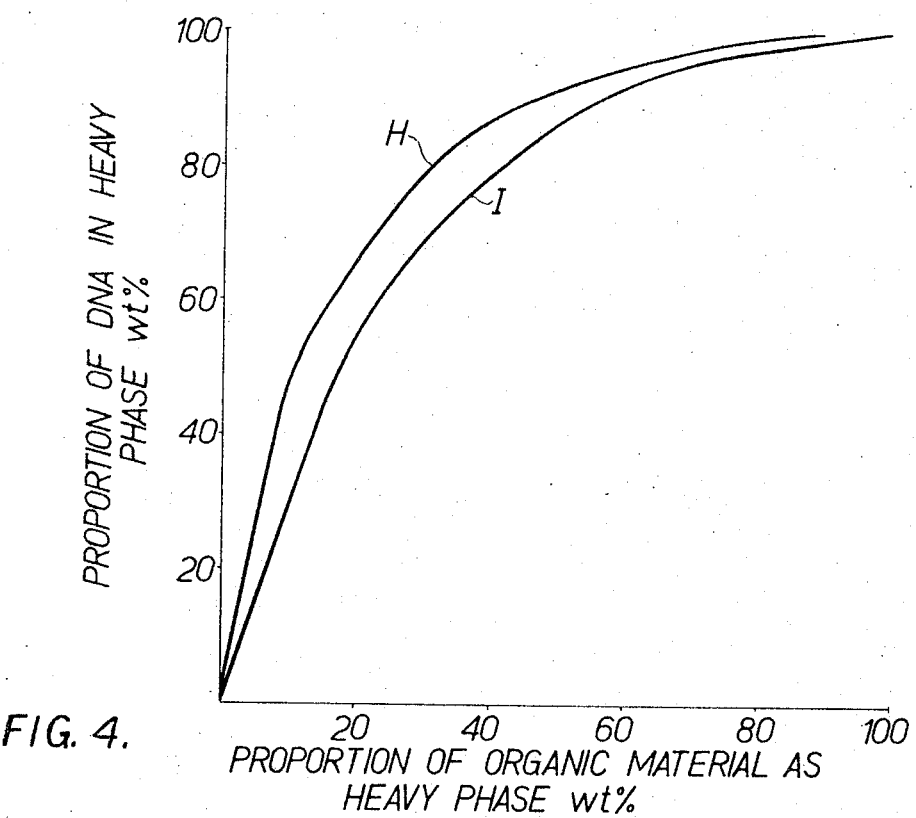
FIG. 4 shows the extraction of D.N.A. from a mixture of D.N.A. and T.N.A.

The results obtained in order to draw the curves in FIG. 3 were also used to obtain the curves in FIG. 4, which shows the proportion of the total D.N.A. in the heavy phase for given phase ratios. The curve H was obtained using the results obtained with the degraded amine and thus corresponds to the curve F of FIG. 3, whilst the curve I was obtained using the results from the low secondary amine content mixture and corresponds to the curve G of FIG. 3. From FIG. 4 it can be seen that even when the heavy phase is a low proportion of the total organic material, the bulk of the secondary amine will be contained within the heavy phase. For example, with the degraded amine of curve H, when the proportion of heavy phase is 20% by weight, about 66% by weight of the D.N.A. is in this heavy phase and with the amine of curve I, for the same proportion of heavy phase, about 55% of the D.N.A. is in the heavy phase. Since it is desired to separate the D.N.A. from the T.N.A., it is convenient to carry out the process in a manner such that most of the D.N.A. is contained within a small quantity of heavy phase, and thus a heavy phase content of about 30% by weight, containing 70–80% by weight of D.N.A. (according to the quality of the tertiary amine starting material) is preferred. The compositions required to give the desired phase splitting may be determined by reference to a ternary diagram of the type shown in FIGS. 1 and 2 from whence it is possible to calculate the quantities of water and hydrogen fluoride which must be added to the amine to achieve the desired phase split. The results obtained in order to draw the curves shown in FIGS. 3 and 4 were obtained with light and heavy phases having compositions corresponding to points Y and X respectively on the ternary diagram, and in order to ensure that the two organic phases have compositions corresponding to the points Y and X, it is necessary in the operation of the process to add excess water in order to produce three phases, i.e. to pass into region B of the ternary diagram. In the three phase system, the aqueous phase is the heaviest and thus forms the bottom layer. The densities of the phases in this system are as given in Table III.

TABLE III

| Phase | Approximate Composition (in wt. percent) | Approx. Density (gm./cc.) |
|---|---|---|
| Aqueous | 0.15% HF soln | 1.00+ |
| Heavy Organic | Total Amine 89.5%, HF 5.5%, Water 5.0%. | 0.84 |
| Light Organic | Total Amine 99.4%, HF 0.4%, Water 0.2%. | 0.82 |

The density difference between the two organic layers is thought to be due primarily to the difference in hydrogen fluoride content, and thus it is desirable that the two phases should differ in their hydrogen fluoride contents by as much as possible which is attained when phases with the compositions X and Y are formed. Thus, to ensure the best phase separation, water is added in excess in order that organic phases having compositions corresponding to the points X and Y may be obtained. Once two organic phases have formed they may be separated in the normal fashion and the liquid neutralised with caustic soda solution in order to remove the added hydrogen fluoride.

The extraction process may be worked as either a batch process or as a continuous operation.

The process may be applied to increasing the purity of tertiary amines as described in the following examples, which are concerned with reducing the secondary content of impure T.N.A.

EXAMPLE I

The presence of the secondary amine, D.N.A., and non-basic materials in the impure T.N.A. was confirmed by gas chromatography and also by chemical analysis using the acetous perchloric acid non-aqueous titration method. The presence, and concentration, of the unstable impurity in the impure amine was hidden by the T.N.A. peak during chromatographic analysis, but during the non-aqueous titration the unstable impurity present decomposed and appeared as D.N.A. and non-basic material. From the two analyses, the quantity of the unstable impurity present could be estimated.

In order to show the breakdown of the unstable impurity during the process of the present invention, the impure amine was treated with hydrofluoric acid (up to 10%) stirred for five minutes and the mixture neutralised with caustic soda solution, gas chromatography revealing an increase in the quantity of D.N.A. and nonaldehyde present and thus indicating a breakdown of the unstable impurity present.

The extraction process was then carried out as follows: the impure amine was subjected to a single stage separation, namely treatment with the desired quantity of hydrofluoric acid solution (containing about 40% by weight hydrogen fluoride), separation of the two organic phases followed by neutralisation of the hydrogen fluoride with caustic soda solution. The impure amine, the light and the heavy phases were analysed by the non-aqueous titration method, the results being given in Table IV.

The secondary amine content of the purified amine could be reduced still further by the employment of further separation stages.

The treatment applied to the light phase from a separation could also be applied to the heavy phase, in order to obtain quantities of pure tertiary amine from the heavy phase, as indicated in Example II.

EXAMPLE II

The process of the present invention may be linked up to a hydrogen fluoride plant using T.N.A. In this case the amine is removed from the hydrogen fluoride plant when the tertiary content falls to 75% by weight, and the processed amine is returned to the plant with a tertiary content of 90–95% by weight. The amine may be processed using a two-stage splitting scheme which is summarised in Table VI.

TABLE VI.—RECOVERY OF TERTIARY AMINE

|  | Total weight of stream | Stream contents | | Recovery of tertiary, percent |
|---|---|---|---|---|
|  |  | Weight tertiary | Percent tertiary |  |
| Stage 1: |  |  |  |  |
| Feed (ex HF Plant) | 0 | 0.75 | 75 | } Approx. 85. |
| Product | 0.7 | 0.65 | 92.5 |  |
| Reject | 0.3 | 0.138 | 46.0 |  |
| Stage 2: |  |  |  |  |
| Feed |  | Reject from Stage 1 | |  |
| Product | 0.08 | 0.06 | 75 | } Approx. 5 of recycled to Stage 1. |
| Reject | 0.22 | 0.085 | 38 |  |

Using this process, about 90% of the tertiary amine is recovered at a purity of 92.5% tertiary amine content. If a higher degree of purity of the amine is required, the product from Stage 1 could be processed further to increase the tertiary amine content to the required level.

The amine rejected from Stage 2 has a tertiary content

TABLE IV.—FIRST SINGLE STATE SEPARATION

| Designation | Wt., Percent | Vol., ccs. | Chemical Analyses, Percent | | | Distribution, Percent | | |
|---|---|---|---|---|---|---|---|---|
|  |  |  | Tertiary | Secondary | Non-basic | Tertiary | Secondary | Non-basic |
| Light phase | 44.2 | 57 | 95.5 | 1.4 | 3.1 | 47 | 9.5 | 38 |
| Heavy phase | 55.8 | 72 | 85.5 | 10.5 | 4.0 | 53 | 90.5 | 62 |
| Calculated impure amine | 100 | 129 | 89.9 | 6.5 | 3.6 | 100 | 100 | 100 |
| Actual impure amine | 100 | 129 | 88.1 | 7.9 | 4.0 |  |  |  |

It will be clear that the single stage separation has effected removal of the bulk of the secondary amine (D.N.A.) from the tertiary amine (T.N.A.) in the light phase. This was verified by subjecting a sample of each phase to analyses by gas chromatography.

Further purification was achieved by a steam distillation of the light phase from the preceding separation, nitrogen being used as a carrier gas, this process removing the more volatile impurities from the amine. The steam distilled amine was then further purified by a second single stage separation, the results of which are given in Table V.

of 38% by weight, but further treatment of this was not considered desirable and furthermore it was discovered that it was not possible by the present invention for it was no longer possible to form two organic phases by adjustment of hydrogen fluoride content.

It will be seen that the present invention provides a method for the separation of amines, such method being carried out at room temperature and resulting in negligible degradation of the tertiary amine even if exposed to air.

We claim:

1. A method for reducing the secondary amine content of an impure tertiary amine in which each aliphatic group

TABLE V.—SECOND SINGLE STAGE SEPARATION

| Designation | Wt., Percent | Vol., ccs. | Chemical Analyses, Percent | | | Distribution, Percent | | |
|---|---|---|---|---|---|---|---|---|
|  |  |  | Tertiary | Secondary | Non-basic | Tertiary | Secondary | Non-basic |
| Light phase | 64.4 | 65.5 | 97.6 | 0.8 | 1.6 | 64.6 | 35.7 | 78.3 |
| Heavy phase | 35.6 | 34.5 | 96.6 | 2.6 | 0.8 | 35.4 | 64.3 | 21.7 |
| Calculated steam-distilled product | 100 | 100 | 97.2 | 1.5 | 1.3 | 100 | 100 | 100 |
| Actual steam distilled product | 100 | 100 | 97.1 | 2.1 | 0.8 |  |  |  | attached to the nitrogen atom is a primary alkyl group containing from 6 to 10 carbon atoms and having a chain of at least 6 carbon atoms terminating at the nitrogen atom, comprising the steps of providing said impure tertiary amine in its basic form or in the form of its hydrogen fluoride salt, adding water to the impure amine and, where the amine is provided in its basic form, adding hydrogen fluoride to the impure amine, said water and hydrogen fluoride being added in a quantity sufficient to form two organic phases, each such phase including aqueous hydrogen fluoride and having different concentrations of secondary amine, and separating the organic phases.

2. A method according to claim 1 comprising the steps of adding to said impure tertiary amine, aqueous hydrogen fluoride in sufficient quantity to form two organic phases, each such phase including aqueous hydrogen fluoride and having different concentrations of secondary amine, and separating the organic phases.

3. A method according to claim 1 comprises the steps of partially neutralizing the impure amine in the form of its hydrofluoride salt to form two organic phases, each including aqueous hydrogen fluoride and having different concentrations of secondary amine, and separating the organic phases.

4. The method as claimed in claim 1 when applied to the treatment of impure tri-(3,5,5 trimethylhexyl) amine.

5. A method according to claim 1 wherein the water is added in an amount sufficient to form an aqueous phase heavier than said two organic phases, and wherein at least the lighter of said two organic phases is separated.

6. A method as claimed in claim 5 wherein the said lighter of the two organic phases is subsequently subjected to steam distillation to remove volatile impurities.

7. A method as claimed in claim 6 wherein, after steam distillation, the lighter of the two organic phases is subjected to a further hydrogen fluoride treatment to cause the formation of two organic phases.

References Cited

FOREIGN PATENTS 486,821  6/1938  Great Britain.

CHARLES B. PARKER, *Primary Examiner.*

R. L. RAYMOND, *Assistant Examiner.*